United States Patent [19]

Reis et al.

[11] 4,385,973
[45] May 31, 1983

[54] PROCESS FOR DISINFECTING WATER

[75] Inventors: August K. Reis, Faistenbergerstr. 1, 8000 München 90, Fed. Rep. of Germany; Norbert L. Kirmaier, Aschheim; Meinolf H. A. Schöberl, Prien, both of Fed. Rep. of Germany

[73] Assignee: August K. Reis, Munich, Fed. Rep. of Germany

[21] Appl. No.: 117,810

[22] Filed: Feb. 1, 1980

[30] Foreign Application Priority Data

Aug. 30, 1979 [DE] Fed. Rep. of Germany ....... 2935124

[51] Int. Cl.³ .......................... C02F 1/46; E04H 3/16
[52] U.S. Cl. .................................... 204/149; 210/169; 210/746
[58] Field of Search ....................... 204/149, 151, 152; 210/739, 743, 746, 748, 169

[56] References Cited

U.S. PATENT DOCUMENTS

| | | | |
|---|---|---|---|
| 3,092,566 | 6/1963 | Negus | 204/152 X |
| 3,192,146 | 6/1965 | Vellas et al. | 204/152 X |
| 3,305,472 | 2/1967 | Oldershan et al. | 204/152 X |
| 3,378,479 | 4/1968 | Colvin et al. | 204/152 X |
| 4,038,163 | 7/1977 | Casanovas et al. | 204/152 |
| 4,098,660 | 7/1978 | Eibl et al. | 204/149 X |
| 4,119,517 | 10/1978 | Hengst | 204/149 X |
| 4,172,773 | 8/1979 | Pellegi et al. | 204/149 |
| 4,179,347 | 12/1979 | Krause et al. | 204/149 |
| 4,218,315 | 8/1980 | Hartkorn | 204/149 X |
| 4,246,101 | 1/1981 | Selby | 210/739 X |

Primary Examiner—Donald R. Valentine
Attorney, Agent, or Firm—Donald Brown

[57] ABSTRACT

In a process for disinfecting water by anodic oxidation in a reactor the volumetric flow rate, current density and contact time are selected so that there is an excess of reaction products having oxidizing power in the water at the exit from the reactor, which gives rise to continued disinfection downstream of the reactor. The process is particularly applicable to water for swimming pools.

7 Claims, 1 Drawing Figure

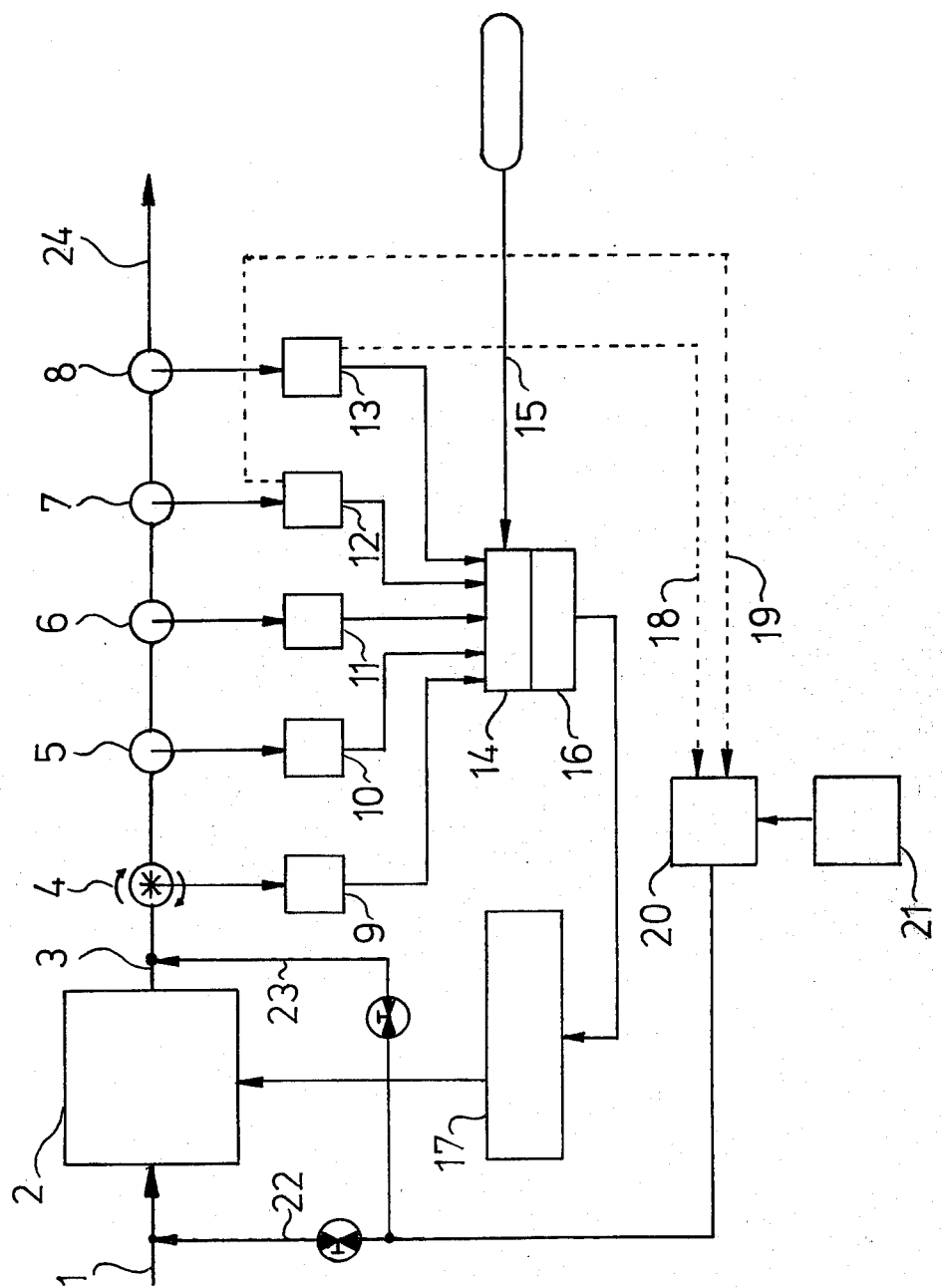

PROCESS FOR DISINFECTING WATER

DESCRIPTION

The invention relates to a process for disinfecting water. In particular, though not exclusively, the invention relates to disinfecting swimming pool water which is circulated with a pump.

The use of anodic oxidation for the disinfection of liquids is known, for example from German Laid Open Patent Specification No. 2,757,854. For this purpose, water which is to be disinfected is passed through a reactor which is provided with electrodes and the water is treated electrochemically. The factors affecting the degree of disinfection are the electrical current density, the volumetric flow rate of the water and the chloride content of the water. In the currently known method, the anodic oxidation is always carried out in such a way that all the parameters which affect the current density and the volumetric flow rate are selected such that disinfection is achieved in the reactor cell itself with the lowest possible power consumption. For this purpose, a high current density and a low contact time in the reactor cell are selected, and these are set precisely so that there are no germs in the water at the exit from the reactor cell, while no reaction products having any oxidising power are present either. This imposes certain limits on the utility of anodic oxidation inasmuch as the completely disinfected water can in fact be re-infected on its way to the point of use and one hundred percent safety is thus not achievable. Such re-infection can for example, occur as a result of leakage in the pipeline leading from the reactor to the point of use. Thus, if the known anodic oxidation techniques are used for the disinfection of pump circulated swimming pool water, the water pumped to the swimming pool from the reactor cell could indeed be disinfected, but infection might occur in transit to the pool and water remaining for several hours in the actual swimming pool could be infected by infection carriers so that there is a direct risk of infection for bathers. Disinfection would take place only after the water had again been pumped out of the pool.

It is an aim of the invention to provide a method of anodic oxidation disinfection wherein the risk of re-infection of the disinfected water is reduced.

According to the invention there is provided a method for disinfecting water by anodic oxidation in which the water is passed through a reactor at a preselected volumetric rate and treated with a predetermined current density for a predetermined contact time, the contact time and the current density being selected so that an excess of reaction products having oxidising power is present in the water at the exit from the reactor.

Further features and advantages of the invention can be seen from the following description given by way of example only with reference to the accompanying drawing in which the sole FIGURE shows a disinfection device with an associated control circuit for carrying out the method according to the invention.

Water which is to be disinfected flows via a feed line 1 into an anodic oxidation reactor 2. The electrochemical treatment takes place in this reactor. Subsequently, the water flows via an exit line 3 through a flowmeter 4 and possibly also, depending on the particular application, and as illustrated, via a device 5 for measuring free or total chlorine, an oxygen electrode 6, a pH-measuring electrode 7 and an electrode 8 to measure the conductivity and redox potential. The signals from the measuring units 4 to 8 are fed via transducers 9 to 13 to a controller 14. The controller 14 compares the measured signals received at its input, with set values fed in via a further input 15. As soon as a control deviation occurs, the controller transmits this deviation, if appropriate, via a computer 16, as an input signal to the voltage supply 17 of the anodic oxidation cell in order to readjust the current density and/or volumetric flow rate and hence contact time. It is thus possible to adapt the variable process parameters and the output parameters of the entire system. By reason of the two measurement units 7 and 8, it is also possible to meter in chemical agents, for example to add alkali hydroxide solutions for proportioning the sodium chloride content. For this purpose, output signals of the measurement transducers 12, 13 are also fed via lines 18, 19 to a metering device 20 which is connected to a stock vessel 21 for agents to be metered in. Depending on the particular case, the metering agent can be added by the metering device 20 to the liquid to be treated, either upstream of the reactor via a line 22 or downstream of the reactor via a line 23.

In one way of performing the method of the invention, the aim is a full disinfection from germs of the water flowing into the reactor 2, while the quantity of electrical energy fed in is such that an excess of reaction products having oxidising power is still present in the water at the exit 3. This mode of operation enables the treated and disinfected liquid to have a bactericidal after-effect which persists for many hours. The contact time is prolonged to such an extent that a desired quantity of reaction products with oxygen and chlorine appears at the exit 3, these reaction products providing reliable protection against re-infection, for example due to leakages in the pipeline system, over a predetermined length of water main (for example in water supply networks). Thus, germs which may enter the line leading to the point of use via a leak are killed off for a period of hours by the reaction products, present in the exit line 3, having oxidising power.

A specific problem arises in the treatment of swimming pool water. Swimming pool water which is exposed to a continuing bacteriological, virological and chemical loading represents a dangerous source of infection. Employment of the method of the invention, for instance with the device shown in the FIGURE, has the result that the water flowing at the outflow 24 to the point of use, in this case the swimming pool, has a bactericidal after-effect, which persists for several hours, due to the reaction products contained therein which have oxidising power. Thus germs are directly inactivated in the swimming pool during metering-in, before they reach any people. In any case, the germ concentration in the swimming pool is considerably reduced and the risk of an infection is thus diminished.

In a modified way of performing the invention, the current density is reduced to such an extent that only a part of the microbial content of the water or the liquid is killed off in the reactor itself, and residual microbes are only affected by the after-effect of the reaction products, formed in the reactor and having an oxidising effect, in the downstream exit line 3 or the outflow 24. The experimentally determined duration of the after-effect in this mode of operation can be in the range from about 2 to 5 minutes, and in some cases 10 minutes and more. With this procedure, energy can be saved since the requisite current density is lower. The duration of the after-effect can be increased further by reducing the current density and extending the contact time correspondingly, as a result of which the proportion of reaction products grows.

Under certain circumstances, the proportion of reaction products having oxidising power cannot be increased to any desired extent. For example, depending on the application, there is an upper limit to the possible proportion of free Cl. The preferred aim, therefore, is that the water flowing through the outflow 24 has a content of 0.1 mg/l to 0.6 mg/l of free chlorine or somewhat less. The contact time should be about 3 seconds or more preferably at least 5 seconds. Particularly good values are obtained when the contact time is about 9 seconds or more. The corresponding current density depends on the geometry of the reactor and must be determined for each particular application.

We claim:

1. The process for disinfecting water by anodic oxidation for delivery to a swimming pool comprising in a closed circuit embodying a reactor and plumbing for delivering disinfectant water from the reactor to the pool and for returning water from the pool to the reactor, passing the water through the reactor at a predetermined volumetric rate and treated with a predetermined current density for a predetermined contact time, the contact time and the current density being selected so that an excess of reaction products having oxidizing power is present in the water flowing from the reactor through the plumbing to the pool wherein at least one of the following water parameters; volumetric rate, content of free chlorine, content of oxygen, pH-value, conductivity value or redox potential is measured, the values of which are processed in a computer in case of deviation from set values in order to adjust current density, volumentric rate or both.

2. A process according to claim 1, wherein a relatively long contact time and a relatively small current density are employed.

3. A process according to claim 1 wherein the contact time is at least 3 seconds.

4. A process according to claim 3, wherein the contact time is at least 5 seconds.

5. A process according to claim 4, wherein the contact time is 9 seconds or more.

6. A process according to claim 1, wherein the current density is set such that at least 0.1 mg/l and at most 0.6 mg/l of free chlorine and at most 0.01 mg/l of ozone and at least 10 mg/l of oxygen are present in the water at the exit from the reactor.

7. The process of claim 1 in which the water is provided to the reactor from a swimming pool.

* * * * *